US012574950B2

(12) United States Patent
Tang

(10) Patent No.: US 12,574,950 B2
(45) Date of Patent: Mar. 10, 2026

(54) METHOD FOR CONFIGURING RESOURCES FOR PHYSICAL DOWNLINK CONTROL CHANNEL TRANSMISSION, TERMINAL DEVICE AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 194 days.

(21) Appl. No.: 18/332,664

(22) Filed: Jun. 9, 2023

(65) Prior Publication Data

US 2023/0319861 A1 Oct. 5, 2023

Related U.S. Application Data

(63) Continuation of application No. 17/537,479, filed on Nov. 29, 2021, now Pat. No. 11,758,568, which is a
(Continued)

(51) Int. Cl.
*H04W 72/04* (2023.01)
*H04W 24/08* (2009.01)
(Continued)

(52) U.S. Cl.
CPC .......... *H04W 72/53* (2023.01); *H04W 24/08* (2013.01); *H04W 72/0446* (2013.01); *H04W 72/23* (2023.01); *H04W 76/27* (2018.02)

(58) Field of Classification Search
CPC ......... H04W 72/0493; H04W 72/0446; H04W 72/042; H04W 24/08; H04W 76/27;
(Continued)

(56) References Cited

U.S. PATENT DOCUMENTS 7,664,119 B2 2/2010 Adams
9,692,692 B1 * 6/2017 Vairavakkalai ....... H04L 45/745
(Continued)

FOREIGN PATENT DOCUMENTS

CN 102368759 A 3/2012
CN 102986265 A 3/2013
(Continued)

OTHER PUBLICATIONS

Second Office Action of the Chinese application No. 201780090729. 4, issued on Jan. 10, 2024, 9 pages with English translation.
(Continued)

*Primary Examiner* — Wei Zhao
(74) *Attorney, Agent, or Firm* — PERKINS COIE LLP

(57) ABSTRACT

A wireless communication method and a network device are provided. The method includes operations as follows. The network device sends configuration information to a terminal device. The configuration information is used to configure a time-domain position of a first resource, the first resource is used to transmit a physical downlink control channel, the configuration information includes first configuration information and second configuration information, the first configuration information indicates at least one first time-domain unit, each first time-domain unit includes the first resource, the second configuration information indicates at least one second time-domain unit in the first time-domain unit indicated by the first configuration information, and each second time-domain unit includes a part or all of the first resource. The network device transmits the physical downlink control channel to the terminal device on the first resource.

20 Claims, 5 Drawing Sheets

<u>100</u>

Related U.S. Application Data continuation of application No. 16/626,232, filed as application No. PCT/CN2017/096910 on Aug. 10, 2017, now Pat. No. 11,212,809.

(51) Int. Cl.

| | | |
|---|---|---|
| *H04W 72/0446* | (2023.01) | |
| *H04W 72/23* | (2023.01) | |
| *H04W 72/53* | (2023.01) | |
| *H04W 76/27* | (2018.01) | |

(58) Field of Classification Search

CPC .... H04W 4/06; H04W 72/044; H04L 5/0053; H04L 5/0064; H04L 45/025; H04L 5/005; H04L 5/006

See application file for complete search history.

(56) References Cited

U.S. PATENT DOCUMENTS

| | | | |
|---|---|---|---|
| 2012/0113866 A1 | 5/2012 | Tenny | |
| 2013/0294316 A1* | 11/2013 | Amerga | H04W 72/005 370/312 |
| 2013/0294318 A1 | 11/2013 | Amerga et al. | |
| 2015/0208394 A1 | 7/2015 | Seo et al. | |
| 2018/0279327 A1* | 9/2018 | Ying | H04W 72/0446 |
| 2019/0306737 A1 | 10/2019 | Kwak et al. | |

FOREIGN PATENT DOCUMENTS

| | | |
|---|---|---|
| CN | 103107857 A | 5/2013 |
| CN | 103200683 A | 7/2013 |
| CN | 103220690 A | 7/2013 |
| CN | 106535333 A | 3/2017 |
| CN | 106688300 A | 5/2017 |
| CN | 106851744 A | 6/2017 |
| CN | 106941724 A | 7/2017 |
| CN | 107005354 A | 8/2017 |
| CN | 107005992 A | 8/2017 |
| CN | 102625457 B | 1/2018 |
| CN | 110771228 A | 2/2020 |
| CN | 111278136 B | 12/2021 |
| EP | 3349524 A1 | 7/2018 |
| EP | 3619879 A1 | 3/2020 |
| JP | 2017516388 A | 6/2017 |
| RU | 2599729 C1 | 10/2016 |
| WO | 2013007144 A1 | 1/2013 |
| WO | 2013102407 A1 | 7/2013 |
| WO | 2016148752 A1 | 9/2016 |
| WO | 2017015813 A1 | 2/2017 |
| WO | 2017041601 A1 | 3/2017 |
| WO | 2018128427 A1 | 7/2018 |
| WO | 2018204886 A1 | 11/2018 |

OTHER PUBLICATIONS

Notice of Allowance of the Chinese application No. 201780090729. 4, issued on Mar. 27, 2024, 7 pages with English translation.

First Office Action of the Malaysian application No. PI2019007080, issued on Feb. 9, 2024, 4 pages.

Decision of Rejection of the Japanese application No. 2022-014101, issued on Oct. 13, 2023, 7 pages with English translation.

Interlocutory Decision in Opposition Proceedings of the European application No. 17920978.8, issued on Nov. 9, 2023, 297 pages.

First Office Action of the Brazilian application No. BR1120190278699, issued on Jan. 2, 2024, 8 pages with English translation.

U.S. Appl. No. 62/520,235, Inventor: Nam Young-Han; Chen Hao; Guo Li; Chandrasekhar Vikram, Date of Publication: Jul. 12, 2018, Title: Method and Apparatus for System Information Delivery in Advanced Wireless Systems. Cited in the whole document. 34 pages.

3GPP TSG-RAN WG2 #98-AH Tdoc R2-1707121, Qingdao, P.R. of China, Jun. 27-29, 2017, Agenda Item: 10.3.1.2, Source: Ericsson, Title: Details of PDCCH monitoring patterns, Document for: Discussion, Decision. the whole document. 4 pages.

Second Office Action of the European application No. 21185338.7, issued on Oct. 16, 2024, 8 pages.

Third Office Action of the Malaysian application No. PI2019007080, issued on Nov. 15, 2024, 3 pages.

Notice of Allowance of the Japanese application No. 2022-014101, issued on May 31, 2024, 5 pages with English translation.

Second Office Action of the Malaysian application No. PI2019007080, issued on Jul. 5, 2024, 3 pages.

Intel Corporation.,"NR PDCCH: Search Spaces and Monitoring Behavior.", 3GPP TSG RAN WG1 NR Adhoc #2, R1-1710544., Jun. 23, 2017 (Jun. 23, 2017), section 3.

Guangdong Oppo Mobile Telecom. "PDCCH Coreset Configuration and UE Procedure on NR-PDCCH." 3GPP TSG RAN WG1 NR Ad-Hoc#2, R1-1710150.Jun. 30, 2017 (Jun. 30, 2017), entire document.

International Search Report in the international application No. PCT/CN2017/096910, mailed on Apr. 26, 2018.

Catt, "Configuration aspects of the NR-PDCCH", 3GPP TSG AN WG1 NR Ad-Hoc#2 R1-1710076 Qingdao, P.R. China, Jun. 27-30, 2017.

ZTE, "NR PDCCH Coreset Configuration", 3GPP TSG RAN WG1 Meeting #AH_NR2 R1-1710106 Qingdao, China, Jun. 26-30, 2017.

MediaTek Inc., "Discussions on CORESET configurations", 3GPP TSG RAN WG1 Meeting NR AH#2 R1-1710790 Qingdao, China, Jun. 27-30, 2017.

NTT DOCOMO, Inc., "Views on control resource set configuration for NR-PDCCH", 3GPP TSG RAN WG1 NR Ad-Hoc#2 R1-1711090 Qingdao, P.R. China Jun. 27-30, 2017.

English translation of the Written Opinion of the International Search Authority in the international application No. PCT/CN2017/096910, mailed on Apr. 26, 2018.

AT&T: "Transmission duration indicationfor symbol-level/slot-level/multi-slot-level scheduling", 3GPP Draft;R1-1710414 ATT TDM, 3rd Generation Partnership Project (3GPP), Mobile Competence Centre; 650, Route Des Lucioles; F-06921 Sophia-Antipolis Cedex France vol. RAN WG1, No. Qingdao, P.R. China; Jun. 27-Jun. 30, 2017 Jun. 26, 2017 (Jun. 26, 2017), XP051299626, Configuration of PDCCH monitoring occasions; p. 4, paragraph 4-p. 5 *.

Supplementary European Search Report in the European application No. 17920978.8, mailed on Jun. 18, 2020.

Notice of Allowance of the Russian application No. 2020100725, issued on Sep. 28, 2020.

First Office Action of the Chinese application No. 201911323331.8, issued on Nov. 3, 2020.

Notice of Allowance of the Chinese application No. 201911323331. 8, issued on Jan. 18, 2021.

First Office Action of the Indian application No. 201917052966, issued on Mar. 19, 2021.

First Office Action of the Canadian application No. 3066829, issued on Feb. 22, 2021.

First Office Action of the Chilean application No. 202000033, issued on Mar. 17, 2021.

First Office Action of the Japanese application No. 2020-500211, issued on Jul. 2, 2021.

First Office Action of the Taiwanese application No. 107128052, issued on Aug. 10, 2021.

Written Opinion of the Singaporean application No. 11201911687U, issued on Sep. 13, 2021.

PDCCH Coreset configuration and UE procedure on NR-PDCCH, 3GPP TSG RAN WG1 meeting #89, Hangzhou, PR China, R1-1707703. May 19, 2017 The whole document.

First Office Action of the U.S. Appl. No. 16/626,232, issued on Mar. 31, 2021.

Supplementary European Search Report in the European application No. 21185338.7, issued on Sep. 24, 2021.

3GPP TS 36.211 V14.2.0 (Mar. 2017), 3rd Generation Partnership Project; Technical Specification Group Radio Access Network; Evolved Universal Terrestrial Radio Access (E-UTRA); Physical channels and modulation, (Release 14).

(56)　　　　　References Cited

OTHER PUBLICATIONS

3GPP TS 36.213 V14.2.0 (Mar. 2017), 3rd Generation Partnership Project; Technical Specification Group Radio Access Network; Evolved Universal Terrestrial Radio Access (E-UTRA); Physical layer procedures, (Release 14).
3GPP TS 36.331 V14.2.2 (Apr. 2017), 3rd Generation Partnership Project; Technical Specification Group Radio Access Network; Evolved Universal Terrestrial Radio Access (E-UTRA); Radio Resource Control (RRC); Protocol specification, (Release 14).
3GPP TS 45.002 V10.0.0 (Mar. 2011), 3rd Generation Partnership Project; Technical Specification Group GSM/EDGE Radio Access, Network; Multiplexing and multiple access on the radio path, (Release 10).
3GPP TS 44.004 V10.0.0 (Mar. 2011), 3rd Generation Partnership Project; Technical Specification Group GSM/EDGE Radio Access Network; Layer 1; General requirements, (Release 10).
3GPP TS 44.018 V10.2.0 (Mar. 2011), 3rd Generation Partnership Project; Technical Specification Group GSM/EDGE Radio Access Network; Mobile radio interface layer 3 specification; Radio Resource Control (RRC) protocol, (Release 10).
3GPP TSG-RAN WG2 #98 R2-1704913, Hangzhou, P.R. China, May 15-19, 2017, Agenda Item: 10.3.1.9, Source: InterDigital Inc., Title: C-DRX for Multiple Numerologies, Document for: Discussion, Decision.
Notice of opposition of the European application No. 17920978.8, issued on Feb. 18, 2022.
First Office Action of the Korean application No. 10-2020-7004283, issued on Feb. 18, 2022.
Second Office Action of the Korean application No. 10-2020-7004283, issued on May 2, 2022.
Supplementary Notice of Allowance of the U.S. Appl. No. 16/626,232, issued on Dec. 3, 2021.
First Office Action of the Israeli application No. 271273, issued on Jun. 29, 2022.

Guangdong OPPO Mobile Telecom "Some remaining issues on CORESET configuration" 3GPP TSG RAN WG1 Meeting #90 R1-1713259, Aug. 21-25, 2017.
Notice of Allowance of the Korean application No. 10-2020-7004283, issued on Aug. 9, 2022.
First Office Action of the Australian application No. 2017426620, issued on Oct. 7, 2022.
First Office Action of the Vietnamese application No. 1-2019-07371, issued on Nov. 29, 2022.
Notice of Oral examination of the European application No. 17920978. 8, issued on Feb. 3, 2023.
Samsung, R2-1706425, "Further details on indication for scheduling", 3GPP TSG RAN WG2 #AHS, 3GPP.
First Office Action of the Korean application No. 10-2022-7037939, issued on Jan. 17, 2023.
First Office Action of the Mexican application No. MX/a/2020/000499, issued on Feb. 21, 2023.
First Office Action of the Japanese application No. 2022-014101, issued on Apr. 28, 2023.
First Office Action of the U.S. Appl. No. 17/537,479, issued on Nov. 18, 2022.
Second Written Opinion of the Singaporean application No. 11201911687U, issued on May 3, 2023.
First Office Action of the Chinese application No. 201780090729.4, issued on Jul. 21, 2023, 15 pages with English translation.
First Office Action of the European application No. 21185338.7, issued on Jul. 21, 2023, 8 pages.
Hearing Notice of the Indian application No. 201917052966, issued on Aug. 25, 2023, 2 pages with English translation.
First Office Action of the Philippine application No. 12019502748, issued on Jun. 13, 2025, 6 pages.
First Office Action of the Japanese application No. 2024-014009, issued on Jul. 8, 2025, 10 pages with English translation.
Third Office Action of the European application No. 21185338.7, issued on Jan. 23, 2026.

* cited by examiner

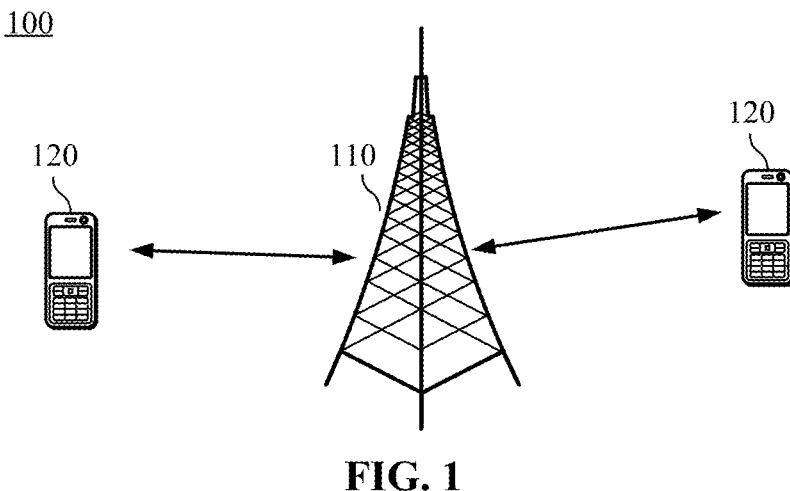

210: A network device sends configuration information to a terminal device, the configuration information is used to configure a time-domain position of a first resource, the first resource is used to transmit a physical downlink control channel, the configuration information includes first configuration information and second configuration information, the first configuration information indicates at least one first time-domain unit, each first time-domain unit includes the first resource, the second configuration information indicates at least one second time-domain unit in the first time-domain unit indicated by the first configuration information, and each second time-domain unit includes a part or all of the first resource 220: The network device transmits the physical downlink control channel to the terminal device on the first resource

FIG. 2

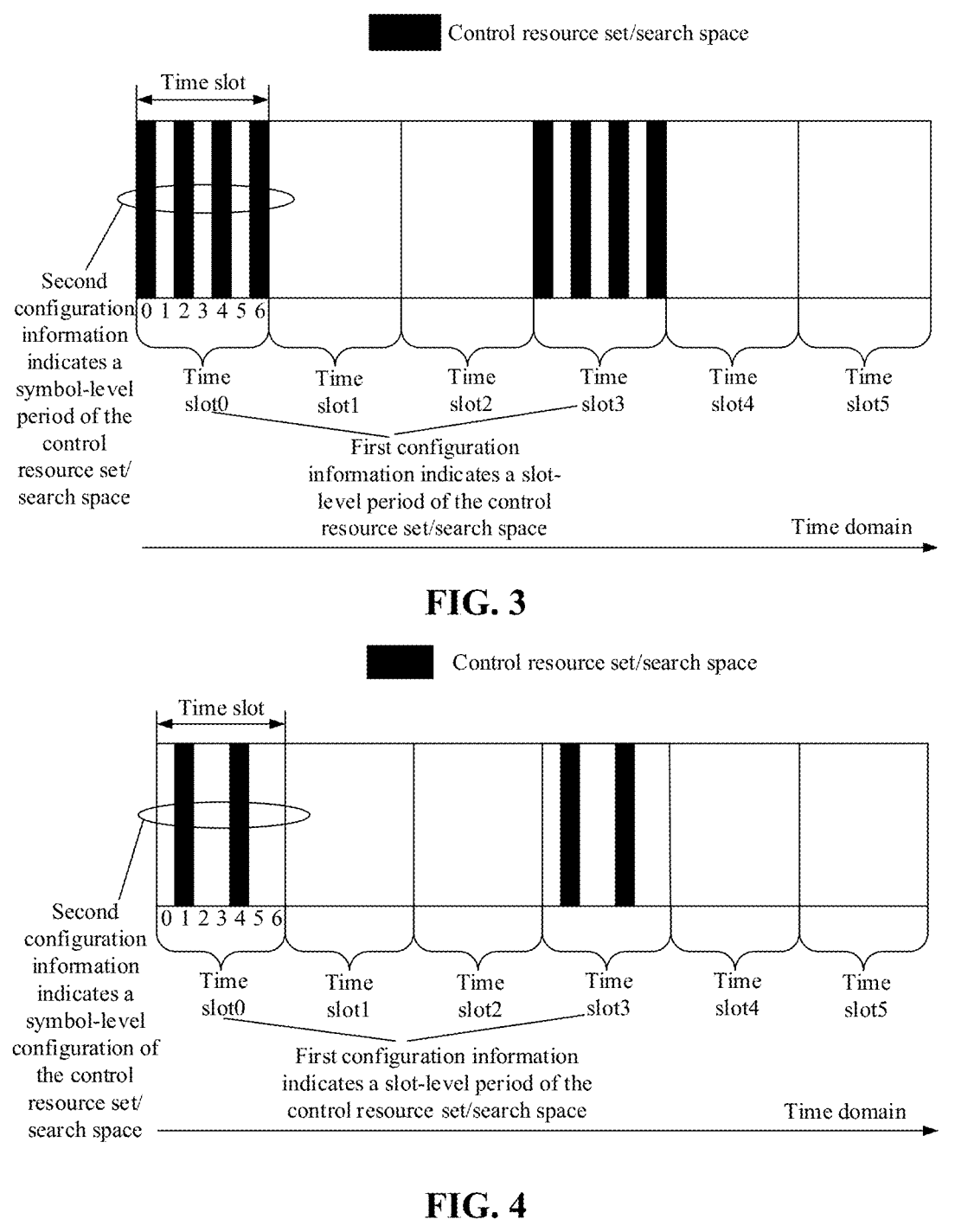

■ Control resource set/search space

Time slot

Second configuration information indicates a symbol-level period of the control resource set/ search space 0 1 2 3 4 5 6

Time slot0     Time slot1     Time slot2     Time slot3     Time slot4     Time slot5

First configuration information indicates a slot-level period of the control resource set/search space Time domain

FIG. 3

■ Control resource set/search space

Time slot

Second configuration information indicates a symbol-level configuration of the control resource set/ search space 0 1 2 3 4 5 6

Time slot0     Time slot1     Time slot2     Time slot3     Time slot4     Time slot5

First configuration information indicates a slot-level period of the control resource set/search space Time domain

310: A terminal device receives configuration information sent by a network device, the configuration information is used to indicate a time-domain position of a first resource, the first resource is used to transmit a physical downlink control channel, the configuration information includes first configuration information and second configuration information, the first configuration information indicates at least one first time-domain unit, each first time-domain unit includes the first resource, the second configuration information indicates at least one second time-domain unit in the first time-domain unit indicated by the first configuration information, and each second time-domain unit includes a part or all of the first resource 320: The terminal device monitors the physical downlink control channel transmitted by the network device on the first resource

FIG. 7

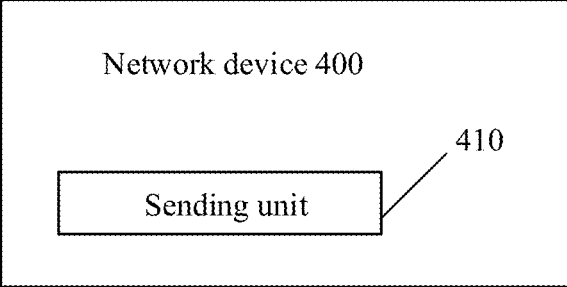

FIG. 8

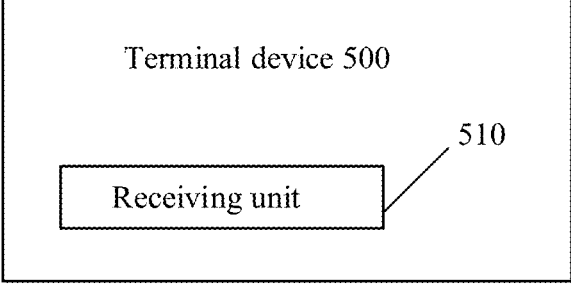

FIG. 9

METHOD FOR CONFIGURING RESOURCES FOR PHYSICAL DOWNLINK CONTROL CHANNEL TRANSMISSION, TERMINAL DEVICE AND NETWORK DEVICE

CROSS-REFERENCE TO RELATED APPLICATIONS

This is a continuation application of U.S. application Ser. No. 17/537,479, filed on Nov. 29, 2021, which is a continuation application of U.S. application Ser. No. 16/626,232, filed on Dec. 23, 2019, which is a national phase of International Patent Application No. PCT/CN2017/096910, filed on Aug. 10, 2017, the contents of which are hereby incorporated by reference in their entireties.

TECHNICAL FIELD

The disclosure relates to the field of communication, and more particularly, to a method for wireless communication, a network device and a terminal device.

BACKGROUND

In a new radio (NR) system, a physical downlink control channel (PDCCH) is transmitted in a control resource set (CORESET). At the present phase, a terminal device may uniformly monitor a CORESET to receive a PDCCH. However, such a CORESET monitoring mechanism is inflexible. In some circumstances, it is not required, for example, in a multi-beam system, for a terminal device to keep monitoring a CORESET at the same frequency. In such case, uniform monitoring for the CORESET may cause additional unnecessary complexity and power consumption of the terminal device. Therefore, how to flexibly configure a PDCCH monitoring manner is a problem urgent to be solved.

SUMMARY

A method for wireless communication, a network device and a terminal device are provided according to the embodiments of the disclosure. The network device may configure a time-domain position of a first resource for transmitting a PDCCH on time slot level, and may also configure a time-domain position of the first resource for transmitting the PDCCH on a symbol level. Therefore, a terminal device is not required to monitor the PDCCH on the first resource in each time slot, thereby reducing energy consumption of the terminal device.

According to a first aspect, a method for wireless communication is provided according to an embodiment of the disclosure, which may include the following operations.

Configuration information is sent to a terminal device. The configuration information is used to configure a time-domain position of a first resource, and the first resource is used to transmit a physical downlink control channel. The configuration information includes first configuration information and second configuration information. The first configuration information indicates at least one first time-domain unit, and each first time-domain unit includes the first resource. The second configuration information indicates at least one second time-domain unit in the first time-domain unit indicated by the first configuration information. Each second time-domain unit includes a part or all of the first resource.

The physical downlink control channel is transmitted to the terminal device on the first resource.

Optionally, the first time-domain unit is a time-domain unit on a time slot level, and the second time-domain unit is a time-domain unit on a symbol level.

Optionally, a time-domain position, indicated by the configuration information, of the first resource may be a time-domain starting position of the first resource.

Accordingly, in the method for wireless communication according to the embodiments of the disclosure, a network device configures the first resource for transmitting the physical downlink control channel at different levels through the first configuration information and the second configuration information, to implement a flexible PDCCH monitoring. Therefore, the terminal device is not required to monitor the PDCCH on the first resource in each time slot, thereby reducing energy consumption of the terminal device.

Optionally, in an implementation of the first aspect, the first time-domain unit may include at least one time slot.

Optionally, in an implementation of the first aspect, the second time-domain unit may include at least one symbol.

Optionally, in an implementation of the first aspect, the first configuration information indicates an occurrence period of the first time-domain unit, or, the first configuration information indicates a time-domain position of the at least one first time-domain unit in a first time period.

Optionally, in an implementation of the first aspect, in response to that the first configuration information indicates the at least one first time-domain unit through the time-domain position in the first time period, the time-domain position in the first time period may include a set of time-domain positions of all of the first time-domain unit in the first time period.

Optionally, in an implementation of the first aspect, the second configuration information indicates an occurrence period of the second time-domain unit, or, the second configuration information indicates a time-domain position of the at least one second time-domain unit in the first time-domain unit.

Optionally, in an implementation of the first aspect, in response to that the second configuration information indicates the at least one second time-domain unit through the time-domain position in the first time-domain unit, the time-domain position in the first time-domain unit may include at least one of: a position of a starting symbol of the first resource in the first time-domain unit, information of time-domain lengths of all of the first resource in the first time-domain unit, or a set of time-domain positions of all of the first resource in the first time-domain unit.

Optionally, in an implementation of the first aspect, the first configuration information may be any information of radio resource control (RRC) signaling, system information, downlink control information (DCI) or a media access control control element (MAC CE).

The second configuration information may be any information of RRC signaling, system information, DCI or a MAC CE.

Optionally, in an implementation of the first aspect, the first resource may be a control resource set or search space for transmitting the physical downlink control channel.

According to a second aspect, a method for wireless communication is provided according to an embodiment of the disclosure, which may include the following operations.

Configuration information sent by a network device is received. The configuration information is used to indicate a time-domain position of a first resource, and the first resource is used to transmit a physical downlink control channel. The configuration information includes first configuration information and second configuration information. The first configuration information indicates at least one first time-domain unit, and each first time-domain unit includes the first resource. The second configuration information indicates at least one second time-domain unit in the first time-domain unit indicated by the first configuration information, and each second time-domain unit includes a part or all of the first resource.

The physical downlink control channel transmitted by the network device is monitored on the first resource.

Accordingly, in the method for wireless communication of the embodiments of the disclosure, the network device configures the first resource for transmitting the physical downlink control channel at different levels through the first configuration information and the second configuration information, to implement more flexible PDCCH monitoring. Therefore, a terminal device is not required to monitor the PDCCH on the first resource in each time slot, thereby reducing energy consumption of the terminal device.

Optionally, in an implementation of the first aspect, the first time-domain unit may include at least one time slot.

Optionally, in an implementation of the first aspect, the second time-domain unit may include at least one symbol.

Optionally, in an implementation of the first aspect, the first configuration information indicates an occurrence period of the first time-domain unit, or, the first configuration information indicates a time-domain position of the at least one first time-domain unit in a first time period.

Optionally, in an implementation of the first aspect, in response to that the first configuration information indicates the at least one first time-domain unit through the time-domain position in the first time period, the time-domain position in the first time period may include a set of time-domain positions of all of the first time-domain unit in the first time period Optionally, in an implementation of the first aspect, the second configuration information indicates an occurrence period of the second time-domain unit, or, the second configuration information indicates a time-domain position of the at least one second time-domain unit in the first time-domain unit.

Optionally, in an implementation mode of the first aspect, in response to that the second configuration information indicates the at least one second time-domain unit through the time-domain position in the first time-domain unit, the time-domain position in the first time-domain unit may include at least one of: a position of a starting symbol of the first resource in the first time-domain unit, information of time-domain lengths of all of the first resource in the first time-domain unit, or a set of time-domain positions of all of the first resource in the first time-domain unit.

Optionally, in an implementation of the first aspect, the first configuration information may be any information of radio resource control (RRC) signaling, system information, downlink control information (DCI) or a media access control control element (MAC CE).

The second configuration information may be any information of RRC signaling, system information, DCI or a MAC CE.

Optionally, in an implementation of the first aspect, the first resource may be a control resource set or search space for transmitting the physical downlink control channel.

According to a third aspect, a network device is provided according to an embodiment of the disclosure, which may include modules or units that can execute the method in the first aspect or any optional implementation of the first aspect.

According to a fourth aspect, a terminal device is provided according to an embodiment of the disclosure, which may include modules or units that can execute the method in the second aspect or any optional implementation of the second aspect.

According to a fifth aspect, a network device is provided, which includes a processor, a memory and a communication interface. The processor is connected with the memory and the communication interface. The memory is configured to store an instruction, the processor is configured to execute the instruction, and the communication interface is configured to communicate with another network element under control of the processor. The processor, when executing the instruction stored in the memory, executes the method in the first aspect or any possible implementation of the first aspect.

According to a sixth aspect, a terminal device is provided, which includes a processor, a memory and a communication interface. The processor is connected with the memory and the communication interface. The memory is configured to store an instruction, the processor is configured to execute the instruction, and the communication interface is configured to communicate with another network element under control of the processor. The processor, when executing the instruction stored in the memory, executes the method in the second aspect or any possible implementation of the second aspect.

According to a seventh aspect, a computer storage medium having a program code stored thereon is provided. The program code includes an instruction configured to instruct a computer to execute the method in the first aspect or any possible implementation of the first aspect.

According to an eighth aspect, a computer storage medium having a program code stored thereon is provided. The program code includes an instruction configured to instruct a computer to execute the method in the second aspect or any possible implementation of the second aspect.

According to a ninth aspect, a computer program product having an instruction is provided. The instruction, when being run in a computer, enables the computer to execute the method in each of the above aspects.

BRIEF DESCRIPTION OF DRAWINGS

FIG. 1 illustrates a system for wireless communication to which the embodiments of the disclosure are applied.

FIG. 2 is a schematic flowchart of a method for wireless communication according to an embodiment of the disclosure.

FIG. 3 is a schematic diagram showing a distribution of time-domain positions of first resources according to an embodiment of the disclosure.

FIG. 4 is a schematic diagram showing another distribution of time-domain positions of first resources according to an embodiment of the disclosure.

FIG. 7 is a schematic flowchart of another method for wireless communication according to an embodiment of the disclosure.

FIG. 8 is a schematic block diagram of a network device according to an embodiment of the disclosure.

FIG. 9 is a schematic block diagram of a terminal device according to an embodiment of the disclosure.

Figure 10:
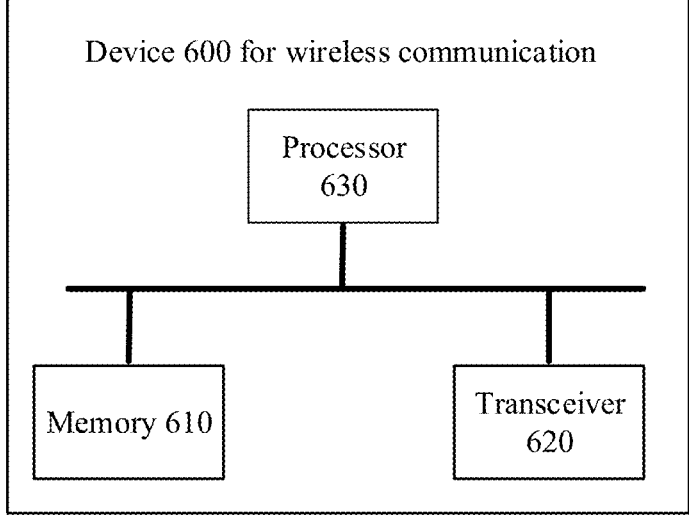

FIG. 10 is a schematic block diagram of a device for wireless communication according to an embodiment of the disclosure.

Figure 11:
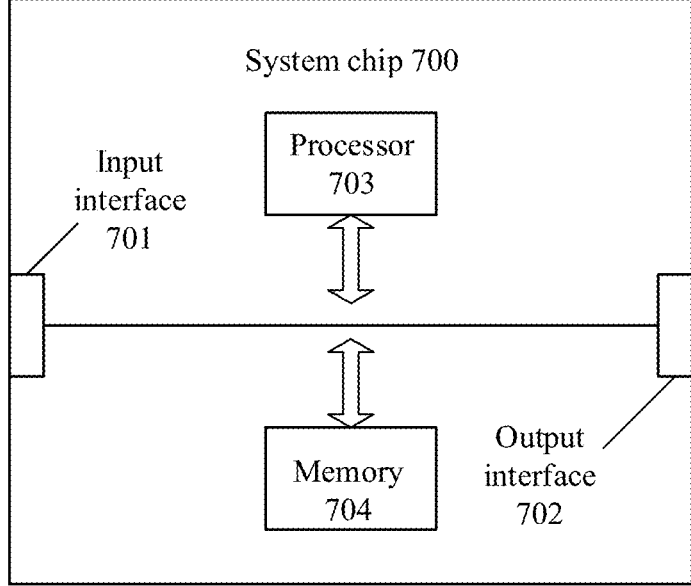

FIG. 11 is a schematic structural diagram of a system chip according to an embodiment of the disclosure.

DETAILED DESCRIPTION

The technical solutions in the embodiments of the disclosure will be clearly and completely described below in combination with the drawings in the embodiments of the disclosure.

The technical solutions of the embodiments of the disclosure may be applied to various communication systems, for example, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system or a future 5th-Generation (5G) system.

FIG. 1 illustrates a system 100 for wireless communication to which the embodiments of the disclosure are applied. The system 100 for wireless communication may include a network device 110. The network device 110 may be a device which communicates with a terminal device. A communication coverage of the network device 110 may be in a specific geographical region, and the network device 110 may communicate with a terminal device (for example, a UE) in the coverage. Optionally, the network device 110 may be a base transceiver station (BTS) in the GSM or the CDMA system, or may also be a base station (NodeB, NB) in the WCDMA system, or may further be an evolutional Node B (eNB or eNodeB) in the LTE system or a wireless controller in a cloud radio access network (CRAN). Alternatively, the network device may be a relay station, an access point, a vehicle-mounted device, a wearable device, a network-side device in the future 5G network, a network device in a future evolved public land mobile network (PLMN) or the like.

The system 100 for wireless communication further includes at least one terminal device 120 within the coverage of the network device 110. The terminal device 120 may be mobile or fixed. Optionally, the terminal device 120 may refer to an access terminal, a user equipment (UE), a user unit, a user station, a mobile station, a mobile radio station, a remote station, a remote terminal, a mobile device, a user terminal, a terminal, a device for wireless communication, a user agent or a user device. The access terminal may be a cell phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the future 5G network, a terminal device in the future evolved PLMN or the like.

Optionally, the terminal device 120 may perform device to device (D2D) communication.

Optionally, the 5G system or network may also be called a new radio (NR) system or network.

A network device and two terminal devices are exemplarily shown in FIG. 1. Optionally, the system 100 for wireless communication may include multiple network devices, and the number of terminal devices in coverage of each network device may be different from two, which is not limited in the embodiments of the disclosure.

Optionally, the system 100 for wireless communication may further include other network entity such as a network controller and a mobility management entity, which is not limited in the embodiments of the disclosure.

In the embodiments of the disclosure, the network device may configure, for the terminal device, a time-domain position of a first resource for transmitting a physical downlink control channel (PDCCH) on a symbol level, and may configure, for the terminal device, a time-domain position of the first resource for transmitting the PDCCH on a time slot level. The terminal device receives the PDCCH sent by the network device at the time-domain position configured by the network device.

Optionally, the first resource may be a control resource set (CORESET) and may also be a search space.

Optionally, the network device may further configure information indicating a time-domain length of the first resource.

Optionally, the control resource set may include a common search resource set and may also include a UE-specific search resource set.

It is to be understood that terms "system" and "network" in the disclosure may usually be exchanged in the disclosure. In the disclosure, term "and/or" only refers to an association relationship describing associated objects, and represents three relationships. For example, A and/or B may represent three cases: i.e., independent existence of A, existence of both A and B and independent existence of B. In addition, character "/" in the disclosure usually represents that an "or" relationship exists between previous and next associated objects.

FIG. 2 is a schematic flowchart of a method 200 for wireless communication according to an embodiment of the disclosure. As shown in FIG. 2, the method 200 may be executed by a network device. The network device may be the network device shown in FIG. 1, and a terminal device in the method 200 may be the terminal device shown in FIG. 1. The method 200 includes the following contents.

At 210, the network device sends configuration information to the terminal device. The configuration information is used to configure a time-domain position of a first resource, and the first resource is used to transmit a physical downlink control channel. The configuration information includes first configuration information and second configuration information. The first configuration information indicates at least one first time-domain unit, and each first time-domain unit includes the first resource. The second configuration information indicates at least one second time-domain unit in the first time-domain unit indicated by the first configuration information and each second time-domain unit includes a part or all of the first resource.

Optionally, a part of the first resource refers to a time-domain starting position of the first resource, and all of the first resource refers to the time-domain starting position of the first resource and a time-domain length of the first resource.

Optionally, the configuration information may indicate only the time-domain starting position of the first resource, or may indicate both the time-domain starting position and time-domain length of the first resource.

Optionally, the first resource is a control resource set (CORESET) or search space for transmitting the physical downlink control channel.

Optionally, the first resource may be a common search space and may also be a UE-specific search space.

Optionally, the first time-domain unit includes at least one time slot. Optionally, the network device may configure the first resource on time slot level of a time domain through the first configuration information.

Optionally, the first configuration information indicates an occurrence period of the first time-domain unit, or, the first configuration information indicates a time-domain position of the at least one first time-domain unit in a first time period.

Optionally, in response to that the first configuration information indicates the at least one first time-domain unit through the time-domain position in the first time period, the time-domain position in the first time period includes a set of time-domain positions of all of the first time-domain unit in the first time period.

Optionally, the first configuration information is any information of radio resource control (RRC) signaling, system information, downlink control information (DCI) or a media access control control element (MAC CE).

Optionally, the second time-domain unit includes at least one symbol. Optionally, the network device may configure the first resource on a symbol level of the time domain through the second configuration information.

Optionally, the second configuration information indicates an occurrence period of the second time-domain unit, or the second configuration information indicates a time-domain position of the at least one second time-domain unit in the first time-domain unit.

Optionally, in response to that the second configuration information indicates the at least one second time-domain unit through the time-domain position in the first time-domain unit, the time-domain position in the first time-domain unit includes at least one of: a position of a starting symbol of the first resource in the first time-domain unit, information of time-domain lengths of all of the first resource in the first time-domain unit, or a set of time-domain positions of all of the first resource in the first time-domain unit.

Optionally, the second configuration information is any information of RRC signaling, system information, DCI or a MAC CE.

Optionally, the network device indicates the occurrence period of the first time-domain unit through the first configuration information, and indicates the occurrence period of the second time-domain unit through the second configuration information.

For example, as shown in FIG. 3, the network device indicates an occurrence period of a time slot including first resources (a CORESET or search space) through the first configuration information, and indicates an occurrence period of a starting symbol of the first resource in the time slot through the second configuration information. As shown in FIG. 3, only time slot 0 out of time slot 0, time slot 1 and time slot 2 includes first resources, and only time slot 3 out of time slot 3, time slot 4 and time slot 5 includes first resources. That is, one time slot out of every three time slots includes the first resources. In each time slot, symbol 0, symbol 2, symbol 4 and symbol 6 are starting symbols of the first resources. That is, one symbol out of every two symbols includes the starting symbol of the first resource.

Optionally, the network device indicates the occurrence period of the first time-domain unit through the first configuration information and indicates the time-domain position of the at least one second time-domain unit in the first time-domain unit through the second configuration information.

For example, as shown in FIG. 4, the network device indicates an occurrence period of a time slot including first resources (a CORESET or search space) through the first configuration information, and indicates a starting symbol of the first resource in the time slot through the second configuration information. Specifically, as shown in FIG. 4, only time slot 0 out of time slot 0, time slot 1 and time slot 2 includes first resources, and only time slot 3 out of time slot 3, time slot 4 and time slot 5 includes first resources. That is, one time slot out of every three time slots includes first resources. A first symbol and a fourth symbol are starting symbols of two first resources in each time slot, respectively.

Optionally, the network device indicates a time-domain position of the at least one first time-domain unit in the first time period through the first configuration information, and indicates the occurrence period of the second time-domain unit through the second configuration information.

Figure 5:
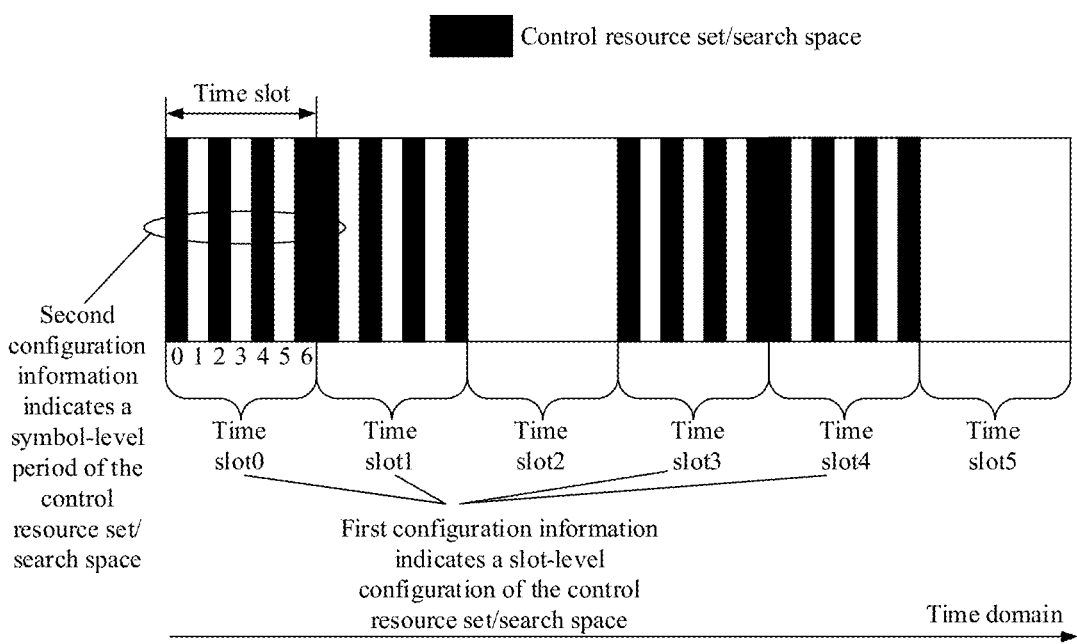
FIG. 5 is a schematic diagram showing another distribution of time-domain positions of first resources according to an embodiment of the disclosure.

For example, as shown in FIG. 5, the network device indicates time slots including first resources (a CORESET or search space) in a certain time period through the first configuration information, and indicates an occurrence period of a starting symbol of the first resource in the time slot through the second configuration information. Specifically, as shown in FIG. 5, time slot 0 and time slot 1 out of time slot 0, time slot 1 and time slot 2 include first resources, and time slot 3 and time slot 4 out of time slot 3, time slot 4 and time slot 5 include first resources. That is, the first two slots out of every three slots include first resources. Symbol 0, symbol 2, symbol 4 and symbol 6 in each time slot are starting symbols of the first resources. That is, one symbol out of every two symbols is the starting symbol of the first resource.

Optionally, the network device indicates the time-domain position of the at least one time-domain unit in the first time period through the first configuration information, and indicates the time-domain position of the at least one second time-domain unit in the first time-domain unit through the second configuration information.

Figure 6:
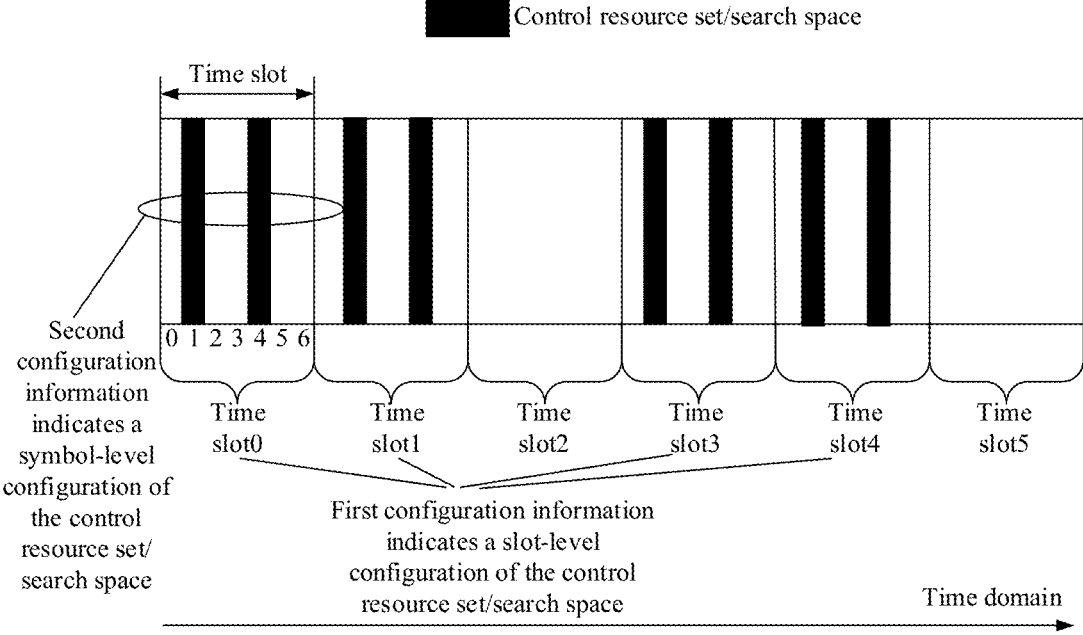
FIG. 6 is a schematic diagram showing another distribution of time-domain positions of first resources according to an embodiment of the disclosure.

For example, as shown in FIG. 6, the network device indicates the time slots including CORESETs in a certain period through the first configuration information, and indicates starting symbols of the CORESETs in the time slot through the second configuration information. Specifically, as shown in FIG. 6, time slot 0 and time slot 1 out of time slot 0, time slot 1 and time slot 2 include first resources, and time slot 3 and time slot 4 out of time slot 3, time slot 4 and time slot 5 include first resources. That is, the first two slots out of every three slots include first resources. Two CORESETS in each time slot start from a first symbol and a fourth symbol respectively.

At 220, the network device transmits a physical downlink control channel to the terminal device on the first resource.

Accordingly, in the method for wireless communication of the embodiment of the disclosure, the network device configures the first resource for transmitting the physical downlink control channel at different levels through the first configuration information and the second configuration information, to implement more flexible PDCCH monitoring. Therefore, the terminal device is not required to monitor the PDCCH on the first resource in each time slot, thereby reducing energy consumption of the terminal device.

Further, the network device indicates the occurrence period of the first time-domain unit or the time-domain position of the at least one first time-domain unit in the first time period through the first configuration information. Therefore, flexible configuration on the time slot level is implemented, and different delay requirements are met.

Furthermore, the network device indicates the occurrence period of the second time-domain unit or the time-domain position of the at least one second time-domain unit in the first time-domain unit through the second configuration information. Therefore, flexible configuration on the symbol level is implemented, and different delay requirements are met.

FIG. 7 is a schematic flowchart of a method 300 for wireless communication according to an embodiment of the disclosure. As shown in FIG. 7, the method 300 may be executed by a terminal device. The terminal device may be the terminal device shown in FIG. 1, and a network device in the method 300 may be the network device shown in FIG. 1. The method 300 includes the following contents.

At 310, the terminal device receives configuration information sent by the network device. The configuration information is used to indicate a time-domain position of a first resource, and the first resource is used to transmit a physical downlink control channel. The configuration information includes first configuration information and second configuration information. The first configuration information indicates at least one first time-domain unit, and each first time-domain unit includes the first resource. The second configuration information indicates at least one second time-domain unit in the first time-domain unit indicated by the first configuration information, and each second time-domain unit includes a part or all of the first resource.

Optionally, the first time-domain unit includes at least one time slot.

Optionally, the second time-domain unit includes at least one symbol.

Optionally, the first configuration information indicates an occurrence period of the first time-domain unit, or, the first configuration information indicates a time-domain position of the at least one first time-domain unit in a first time period.

Optionally, in response to that the first configuration information indicates the at least one first time-domain unit through the time-domain position in the first time period, the time-domain position in the first time period includes a set of time-domain positions of all of the first time-domain unit in the first time period.

Optionally, the second configuration information indicates an occurrence period of the second time-domain unit, or, the second configuration information indicates a time-domain position of the at least one second time-domain unit in the first time-domain unit.

Optionally, in response to that the second configuration information indicates the at least one second time-domain unit through the time-domain position in the first time-domain unit, the time-domain position in the first time-domain unit includes at least one of: a position of a starting symbol of the first resource in the first time-domain unit, information of time-domain lengths of all of the first resource in the first time-domain unit, or a set of time-domain positions of all of the first resource in the first time-domain unit.

Optionally, the first configuration information is any information of radio resource control (RRC) signaling, system information, downlink control information (DCI) or a media access control control element (MAC CE).

The second configuration information is any information of RRC signaling, system information, DCI or a MAC CE.

Optionally, the first resource is a control resource set or search space for transmitting the physical downlink control channel.

At 320, the terminal device monitors the physical downlink control channel transmitted by the network device on the first resource.

Optionally, the terminal device may monitor the physical downlink control channel transmitted by the network device on the first resource at a certain period.

It is to be understood that regarding the steps in the method 300 for wireless communication, reference may be made to the descriptions for the corresponding steps in the method 200 for wireless communication, which is not elaborated herein for simplicity.

Accordingly, in the method for wireless communication of the embodiment of the disclosure, the network device configures the first resource for transmitting the physical downlink control channel at different levels through the first configuration information and the second configuration information, to implement more flexible PDCCH monitoring. Therefore, the terminal device is not required to monitor the PDCCH on the first resource in each time slot, thereby reducing energy consumption of the terminal device.

Further, the network device indicates the occurrence period of the first time-domain unit or the time-domain position of the at least one first time-domain unit in the first time period through the first configuration information. Therefore, flexible configuration on the slot level is implemented, and different delay requirements are met.

Furthermore, the network device indicates the occurrence period of the second time-domain unit or the time-domain position of the at least one second time-domain unit in the first time-domain unit through the second configuration information. Therefore, flexible configuration on the symbol level is implemented, and different delay requirements are met.

FIG. 8 is a schematic block diagram of a network device 400 according to an embodiment of the disclosure. As shown in FIG. 8, the network device 400 includes a sending unit 410.

The sending unit 410 is configured to send configuration information to a terminal device. The configuration information is used to configure a time-domain position of a first resource, and the first resource is used to transmit a physical downlink control channel. The configuration information includes first configuration information and second configuration information. The first configuration information indicates at least one first time-domain unit, and each first time-domain unit includes the first resource. The second configuration information indicates at least one second time-domain unit in the first time-domain unit indicated by the first configuration information, and each second time-domain unit includes a part or all of the first resource.

The sending unit 410 is further configured to transmit the physical downlink control channel to the terminal device on the first resource.

Optionally, the first time-domain unit includes at least one time slot.

Optionally, the second time-domain unit includes at least one symbol.

Optionally, the first configuration information indicates an occurrence period of the first time-domain unit, or, the first configuration information indicates a time-domain position of the at least one first time-domain unit in a first time period.

Optionally, in response to that the first configuration information indicates the at least one first time-domain unit through the time-domain position in the first time period, the time-domain position in the first time period includes a set of time-domain positions of all of the first time-domain unit in the first time period.

Optionally, the second configuration information indicates an occurrence period of the second time-domain unit, or the second configuration information indicates a time-domain position of the at least one second time-domain unit in the first time-domain unit.

Optionally, in response to that the second configuration information indicates the at least one second time-domain unit through the time-domain position in the first time-domain unit, the time-domain position in the first time-domain unit includes at least one of: a position of a starting symbol of the first resource in the first time-domain unit, information of time-domain length of all of the first resource in the first time-domain unit, or a set of time-domain positions of all of the first resource in the first time-domain unit.

Optionally, the first configuration information is any information of radio resource control (RRC) signaling, system information, downlink control information (DCI) or a media access control control element (MAC CE).

The second configuration information is any information of RRC signaling, system information, DCI or a MAC CE.

Optionally, the first resource is a control resource set or search space for transmitting the physical downlink control channel.

It should be understood that the network device 400 according to the embodiment of the disclosure may correspond to the network device in the method embodiment of the disclosure, and at least one of the abovementioned and other operations or functions of each unit in the network device 400 are used to implement the corresponding flows executed by the network device in the method 200 shown in FIG. 2 respectively, and will not be elaborated herein for simplicity.

FIG. 9 is a schematic block diagram of a terminal device 500 according to an embodiment of the disclosure. As shown in FIG. 9, the terminal device 500 includes a receiving unit 510.

The receiving unit 510 is configured to receive configuration information sent by a network device. The configuration information indicates a time-domain position of a first resource, and the first resource is used to transmit a physical downlink control channel. The configuration information includes first configuration information and second configuration information. The first configuration information indicates at least one first time-domain unit, and each first time-domain unit includes the first resource. The second configuration information indicates at least one second time-domain unit in the first time-domain unit indicated by the first configuration information, and each second time-domain unit includes a part or all of the first resource.

The receiving unit 510 is further configured to monitor the physical downlink control channel transmitted by the network device on the first resource.

Optionally, the first time-domain unit includes at least one time slot.

Optionally, the second time-domain unit includes at least one symbol.

Optionally, the first configuration information indicates an occurrence period of the first time-domain unit, or, the first configuration information indicates a time-domain position of the at least one first time-domain unit in a first time period.

Optionally, in response to that the first configuration information indicates the at least one first time-domain unit through the time-domain position in the first time period, the time-domain position in the first time period includes a set of time-domain positions of all of the first time-domain unit in the first time period.

Optionally, the second configuration information indicates an occurrence period of the second time-domain unit, or, the second configuration information indicates a time-domain position of the at least one second time-domain unit in the first time-domain unit.

Optionally, in response to that the second configuration information indicates the at least one second time-domain unit through the time-domain position in the first time-domain unit, the time-domain position in the first time-domain unit includes at least one of: a position of a starting symbol of the first resource in the first time-domain unit, information of time-domain lengths of all of the first resource in the first time-domain unit, or a set of time-domain positions of all of the first resource in the first time-domain unit.

Optionally, the first configuration information is any information of radio resource control (RRC) signaling, system information, downlink control information (DCI) or a media access control control element (MAC CE).

The second configuration information is any information of RRC signaling, system information, DCI or a MAC CE.

Optionally, the first resource is a control resource set or search space for transmitting the physical downlink control channel.

It is to be understood that the terminal device 500 according to the embodiment of the disclosure may correspond to the terminal device in the method embodiment of the disclosure, and at least one of the abovementioned and other operations or functions of each unit in the terminal device 500 are used to implement the corresponding flows executed by the terminal device in the method 300 shown in FIG. 7 respectively, and will not be elaborated herein for simplicity.

FIG. 10 is a schematic block diagram of a device 600 for wireless communication according to an embodiment of the disclosure. The device 600 includes a memory 610, a transceiver 620 and a processor 630.

The memory 610 is configured to store a program. The program includes a code.

The transceiver 620 is configured to communicate with another device.

The processor 630 is configured to execute a program code in the memory 610.

Optionally, when the code is executed, the processor 630 may implement each operation executed by a network device in the method 200 in FIG. 2, which is not elaborated herein for simplicity. In such case, the device 600 may be an access network device, or may also be a core network device. The transceiver 620 is configured to transmit or receive a signal under driving of the processor 630.

Optionally, when the code is executed, the processor 630 may further implement each operation executed by the terminal device in the method 300 in FIG. 7, which is not elaborated herein for simplicity. In such case, the device 600 may be a terminal device, for example, a mobile phone.

It is to be understood that, in the embodiment of the disclosure, the processor 630 may be a central processing unit (CPU), and the processor 630 may also be another universal processor, a digital signal processor (DSP), an application specific integrated circuit (ASIC), an field-programmable gate array (FPGA) or another programmable logic device, a discrete gate or a transistor logic device and a discrete hardware component and the like. The universal processor may be a microprocessor or the processor may also be any conventional processor and the like.

The memory 610 may include a read-only memory (ROM) and a random access memory (RAM) and provides an instruction and data for the processor 630. A part of the memory 610 may further include a nonvolatile random access memory. For example, the memory 610 may further store information on the type of a device.

The transceiver 620 may be configured to have signal sending and receiving functions, for example, frequency modulation and demodulation functions or up-conversion and down-conversion functions.

In an implementation process, at least one step of the above method may be completed through an integrated logical circuit of hardware in the processor 630, or the integrated logical circuit may implement the at least one step under driving of an instruction in a software form. Therefore, the device 600 for wireless communication may be a chip or a chip set. The steps of the method disclosed in combination with the embodiments of the disclosure may be directly embodied to be executed and completed by a hardware processor, or executed and completed by a combination of hardware and software modules in the processor. The software module may be provided in a mature storage medium in this field such as a random access memory, a flash memory, a read-only memory, a programmable read-only memory or electrically erasable programmable memory and a register. The storage medium is provided in the memory. The processor 630 reads information in the memory, and completes the steps of the above methods in combination with hardware thereof, which is not described in detail to avoid repetitions.

FIG. 11 is a schematic structure diagram of a system chip 700 according to an embodiment of the disclosure. The system chip 700 of FIG. 11 includes an input interface 701, an output interface 702, a processor 703 and a memory 704 which may be connected through an internal communication connection line. The processor 703 is configured to execute a code in the memory 704.

Optionally, when the code is executed, the processor 703 implements methods executed by a network device in the method embodiments, which are not elaborated herein for simplicity.

Optionally, when the code is executed, the processor 703 implements methods executed by a terminal device in the method embodiments, which are not elaborated herein for simplicity.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, however, such realization should be considered to fall within the scope of the disclosure.

Those skilled in the art may clearly learn about that regarding specific operation processes of the system, the device and the unit described above, reference may be made to the corresponding processes in the above method embodiment, which are not be elaborated herein for convenient and brief description.

In some embodiments provided by the disclosure, it should be understood that the disclosed system, device and method may be implemented in another manner. For example, the device embodiment described above is only schematic. For example, the units are divided according to logic functions, and may be divided in other division manners during practical implementation. For example, multiple units or components may be combined or integrated into another system, or some characteristics may be neglected or not executed. In addition, displayed or discussed coupling or direct coupling or communication connection may be indirect coupling or communication connection of the device or the units through some interfaces, and may be electrical and mechanical or in other forms.

The units described as separate parts may or may not be physically separated, and parts displayed as units may or may not be physical units. That is, the parts may be located in the same place, or may also be distributed to multiple network units. A part or all of the units may be selected to achieve the purpose of the solutions of the embodiments according to a practical requirement.

In addition, all functional units in each embodiment of the disclosure may be integrated into a processing unit, each unit may also physically exist independently, and two or more units may also be integrated into a unit.

When being implemented in form of software functional unit and sold or used as an independent product, the function may also be stored in a computer-readable storage medium. Based on such understanding, an essential part of the technical solutions of the disclosure or a part thereof making contributions to the conventional art or part of the technical solutions may be embodied in form of software product, and the computer software product is stored in a storage medium, including a plurality of instructions configured to enable a computer device (which may be a personal computer, a server, a network device or the like) to execute all or a part of the steps of the method in each embodiment of the disclosure. The above storage medium includes various media capable of storing program codes such as a U disk, a mobile hard disk, a read-only memory, a read access memory (RAM), a magnetic disk or an optical disk.

The forgoing is only the specific embodiments of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for configuring resources for physical downlink control channel transmission, comprising:

sending configuration information to a terminal device, wherein the configuration information is used to indicate a time-domain position of first resources, the first resources are used to transmit a physical downlink control channel, the configuration information comprises first configuration information and second configuration information, the first configuration information indicates a plurality of time slots, and each time slot of the plurality of time slots indicated by the first configuration information comprises two first resources of the first resources, wherein the second configuration information indicates a time-domain position of at least one symbol in the time slot indicated by the first configuration information, wherein the time-domain position of the at least one symbol in the time slot indicated by the second configuration information comprises a respective starting symbol for each of the two first resources in the time slot indicated by the first configuration information.

2. The method of claim 1, wherein the first configuration information indicates an occurrence period of the time slot, or, the first configuration information indicates a time-domain position of the plurality of time slots in a first time period.

3. The method of claim 2, wherein the time-domain position of the plurality of time slots in the first time period comprises a set of time-domain positions of all of the plurality of time slots in the first time period.

4. A network device, comprising:

a processor;

a memory having an instruction stored thereon; and a communication interface, wherein the processor is configured to execute the instruction to control the communication interface to send configuration information to a terminal device, wherein the configuration information is used to indicate a time-domain position of first resources, the first resources are used to transmit a physical downlink control channel, the configuration information comprises first configuration information and second configuration information, the first configuration information indicates a plurality of time slots, and each time slot of the plurality of time slots indicated by the first configuration information comprises two first resources of the first resources, wherein the second configuration information indicates a time-domain position of at least one symbol in the time slot indicated by the first configuration information, wherein the time-domain position of the at least one symbol in the time slot indicated by the second configuration information comprises a respective starting symbol for each of the two first resources in the time slot indicated by the first configuration information.

5. The network device of claim 4, wherein the first configuration information is carried by radio resource control (RRC) signaling; and the second configuration information is carried by RRC signaling.

6. The network device of claim 4, wherein the first resource is a control resource set or search space for transmitting the physical downlink control channel.

7. The network device of claim 4, wherein the processor is configured to execute the instruction to control the communication interface to transmit the physical downlink control channel at a period.

8. A terminal device, comprising:

a processor;

a memory having an instruction stored thereon; and a communication interface, wherein the processor is configured to execute the instruction to control the communication interface to receive configuration information sent by a network device, wherein the configuration information is used to indicate a time-domain position of first resources, the first resources are used to transmit a physical downlink control channel, the configuration information comprises first configuration information and second configuration information, the first configuration information indicates a plurality of time slots, and each time slot of the plurality of time slots indicated by the first configuration information comprises two first resources of the first resources, wherein the second configuration information indicates a time-domain position of at least one symbol in the time slot indicated by the first configuration information, wherein the time-domain position of the at least one symbol in the time slot indicated by the second configuration information comprises a respective starting symbol for each of the two first resources in the time slot indicated by the first configuration information.

9. The terminal device of claim 8, wherein the first configuration information indicates an occurrence period of the time slot, or, the first configuration information indicates a time-domain position of the plurality of time slots in a first time period.

10. The terminal device of claim 9, wherein the time-domain position of the plurality of time slots in the first time period comprises a set of time-domain positions of all of the plurality of time slots in the first time period.

11. The method of claim 2, wherein the time-domain position of the plurality of time slots in the first time period indicated by the first configuration information comprises:

first two time slots in the first time period.

12. The method of claim 1, wherein the first resource is a search space for transmitting the physical downlink control channel, and the search space is a common search space or a UE-specific search space.

13. The network device of claim 4, wherein the first configuration information indicates a time-domain position of the plurality of time slots in a first time period.

14. The network device of claim 13, wherein the time-domain position of the plurality of time slots in the first time period comprises a set of time-domain positions of all of the plurality of time slots in the first time period.

15. The network device of claim 13, wherein the time-domain position of the plurality of time slots in the first time period indicated by the first configuration information comprises:

first two time slots in the first time period.

16. The network device of claim 6, wherein the search space is a common search space or a UE-specific search space.

17. The terminal device of claim 9, wherein the time-domain position of the plurality of time slots in the first time period indicated by the first configuration information comprises:

first two time slots in the first time period.

18. The terminal device of claim 8, wherein the first resource is a search space for transmitting the physical downlink control channel, and the search space is a common search space or a UE-specific search space.

19. The terminal device of claim 8, wherein the first configuration information is carried by radio resource control (RRC) signaling; and the second configuration information is carried by RRC signaling.

20. The terminal device of claim 8, wherein the first resource is a control resource set for transmitting the physical downlink control channel.

* * * * *